United States Patent
Graham et al.

(10) Patent No.: US 12,177,039 B2
(45) Date of Patent: *Dec. 24, 2024

(54) COLLECTIVE COMMUNICATION SYSTEM AND METHODS

(71) Applicant: MELLANOX TECHNOLOGIES, LTD., Yokneam (IL)

(72) Inventors: Richard Graham, Knoxville, TN (US); Lion Levi, Yavne (IL); Gil Bloch, Zichron Yaakov (IL); Daniel Marcovitch, Haifa (IL); Noam Bloch, Bat Shlomo (IL); Yong Qin, Lafayette, CA (US); Yaniv Blumenfeld, Haifa (IL); Eitan Zahavi, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,565

(22) Filed: Nov. 19, 2023

(65) Prior Publication Data
US 2024/0089147 A1 Mar. 14, 2024

Related U.S. Application Data

(63) Continuation of application No. 17/495,824, filed on Oct. 7, 2021, now Pat. No. 11,876,642, which is a (Continued)

(51) Int. Cl.
*H04L 12/40* (2006.01)
*G06F 12/02* (2006.01)
(Continued)

(52) U.S. Cl.
CPC .... *H04L 12/40182* (2013.01); *G06F 12/0246* (2013.01); *H04B 7/0456* (2013.01); (Continued)

(58) Field of Classification Search
None
See application file for complete search history.

(56) References Cited

U.S. PATENT DOCUMENTS

| 4,933,969 A | 6/1990 | Marshall et al. |
| 5,068,877 A | 11/1991 | Near et al. |

(Continued)

FOREIGN PATENT DOCUMENTS

| AU | 2012216611 B2 | 3/2013 |
| CN | 103095607 A | 5/2013 |

(Continued)

OTHER PUBLICATIONS

Mellanox Technologies, "InfiniScale IV: 36-port 40GB/s Infiniband Switch Device", pp. 1-2, year 2009.
(Continued)

*Primary Examiner* — Srinivasa R Reddivalam
(74) *Attorney, Agent, or Firm* — MEITAR PATENTS LTD.

(57) ABSTRACT

A method includes providing a plurality of processes interconnected by a network, each of the plurality of processes being configured to hold a block of data destined for others of the plurality of processes. A set of data for all-to-all data exchange is received from one or more of the processes. The set of data is configured as a plurality of blocks of data in a matrix as matrix data, the matrix being distributed among the plurality of processes. The matrix data is transposed by changing the position of selected blocks of data of the plurality of blocks of data relative to the other blocks of data of the plurality of the blocks of data, without changing the structure of each of the blocks of data. The transposed matrix data is over the network and is then received, repacked, and conveyed to destination processes.

12 Claims, 10 Drawing Sheets

Related U.S. Application Data continuation of application No. 16/789,458, filed on Feb. 13, 2020, now Pat. No. 11,196,586.

(60) Provisional application No. 62/809,786, filed on Feb. 25, 2019.

(51) Int. Cl.

| | |
|---|---|
| *H04B 7/0456* | (2017.01) |
| *H04L 12/44* | (2006.01) |
| *H04W 24/10* | (2009.01) |
| *H04W 88/06* | (2009.01) |

(52) U.S. Cl.
CPC ............ *H04L 12/44* (2013.01); *H04W 24/10* (2013.01); *H04W 88/06* (2013.01)

(56) References Cited

U.S. PATENT DOCUMENTS

| | | | |
|---|---|---|---|
| 5,325,500 A | 6/1994 | Bell et al. | |
| 5,353,412 A | 10/1994 | Douglas et al. | |
| 5,404,565 A | 4/1995 | Gould et al. | |
| 5,408,469 A | 4/1995 | Opher et al. | |
| 5,606,703 A | 2/1997 | Brady et al. | |
| 5,944,779 A | 8/1999 | Blum | |
| 6,041,049 A | 3/2000 | Brady | |
| 6,115,394 A | 9/2000 | Balachandran et al. | |
| 6,212,197 B1 | 4/2001 | Christensen et al. | |
| 6,370,502 B1 | 4/2002 | Wu et al. | |
| 6,438,137 B1 | 8/2002 | Turner et al. | |
| 6,483,804 B1 | 11/2002 | Muller et al. | |
| 6,507,562 B1 | 1/2003 | Kadansky et al. | |
| 6,728,862 B1 | 4/2004 | Wilson | |
| 6,816,492 B1 | 11/2004 | Turner et al. | |
| 6,857,004 B1 | 2/2005 | Howard et al. | |
| 6,937,576 B1 | 8/2005 | Di Benedetto et al. | |
| 7,102,998 B1 | 9/2006 | Golestani | |
| 7,124,180 B1 | 10/2006 | Ranous | |
| 7,164,422 B1 | 1/2007 | Wholey, III et al. | |
| 7,171,484 B1 | 1/2007 | Krause et al. | |
| 7,224,669 B2 | 5/2007 | Kagan et al. | |
| 7,245,627 B2 | 7/2007 | Goldenberg et al. | |
| 7,313,582 B2 | 12/2007 | Bhanot et al. | |
| 7,327,693 B1 | 2/2008 | Rivers et al. | |
| 7,336,646 B2 | 2/2008 | Muller | |
| 7,346,698 B2 | 3/2008 | Hannaway | |
| 7,555,549 B1 | 6/2009 | Campbell et al. | |
| 7,613,774 B1 | 11/2009 | Caronni et al. | |
| 7,636,424 B1 | 12/2009 | Halikhedkar et al. | |
| 7,636,699 B2 | 12/2009 | Stanfill | |
| 7,676,597 B2 | 3/2010 | Kagan et al. | |
| 7,738,443 B2 | 6/2010 | Kumar | |
| 7,760,743 B2 | 7/2010 | Shokri et al. | |
| 8,213,315 B2 | 7/2012 | Crupnicoff et al. | |
| 8,255,475 B2 | 8/2012 | Kagan et al. | |
| 8,370,675 B2 | 2/2013 | Kagan | |
| 8,380,880 B2 | 2/2013 | Gulley et al. | |
| 8,510,366 B1 | 8/2013 | Anderson et al. | |
| 8,645,663 B2 | 2/2014 | Kagan et al. | |
| 8,738,891 B1 | 5/2014 | Karandikar et al. | |
| 8,761,189 B2 | 6/2014 | Shachar et al. | |
| 8,768,898 B1* | 7/2014 | Trimmer | G06F 16/1827 707/693 |
| 8,775,698 B2 | 7/2014 | Archer et al. | |
| 8,811,417 B2 | 8/2014 | Bloch et al. | |
| 9,110,860 B2 | 8/2015 | Shahar | |
| 9,189,447 B2 | 11/2015 | Faraj | |
| 9,294,551 B1 | 3/2016 | Froese et al. | |
| 9,344,490 B2 | 5/2016 | Bloch et al. | |
| 9,397,960 B2 | 7/2016 | Arad et al. | |
| 9,456,060 B2 | 9/2016 | Pope et al. | |
| 9,563,426 B1 | 2/2017 | Bent et al. | |
| 9,626,329 B2 | 4/2017 | Howard | |
| 9,756,154 B1 | 9/2017 | Jiang | |
| 10,015,106 B1 | 7/2018 | Florissi et al. | |
| 10,027,601 B2 | 7/2018 | Narkis et al. | |
| 10,158,702 B2 | 12/2018 | Bloch et al. | |
| 10,187,400 B1 | 1/2019 | Castro et al. | |
| 10,284,383 B2 | 5/2019 | Bloch et al. | |
| 10,296,351 B1 | 5/2019 | Kohn et al. | |
| 10,305,980 B1 | 5/2019 | Gonzalez et al. | |
| 10,318,306 B1 | 6/2019 | Kohn et al. | |
| 10,320,508 B2 | 6/2019 | Shimizu et al. | |
| 10,425,350 B1 | 9/2019 | Florissi | |
| 10,515,045 B1 | 12/2019 | Mattina | |
| 10,521,283 B2 | 12/2019 | Shuler et al. | |
| 10,528,518 B2 | 1/2020 | Graham et al. | |
| 10,541,938 B1 | 1/2020 | Timmerman et al. | |
| 10,547,553 B2 | 1/2020 | Shattah et al. | |
| 10,621,489 B2 | 4/2020 | Appuswamy et al. | |
| 10,727,966 B1 | 7/2020 | Izenberg et al. | |
| 11,088,971 B2 | 8/2021 | Brody et al. | |
| 11,336,383 B2 | 5/2022 | Mula et al. | |
| 11,388,263 B2 | 7/2022 | Levi et al. | |
| 2002/0010844 A1 | 1/2002 | Noel et al. | |
| 2002/0035625 A1 | 3/2002 | Tanaka | |
| 2002/0150094 A1 | 10/2002 | Cheng et al. | |
| 2002/0150106 A1 | 10/2002 | Kagan et al. | |
| 2002/0152315 A1 | 10/2002 | Kagan et al. | |
| 2002/0152327 A1 | 10/2002 | Kagan et al. | |
| 2002/0152328 A1 | 10/2002 | Kagan et al. | |
| 2002/0165897 A1 | 11/2002 | Kagan et al. | |
| 2003/0002483 A1 | 1/2003 | Zwack | |
| 2003/0018828 A1 | 1/2003 | Craddock et al. | |
| 2003/0061417 A1 | 3/2003 | Craddock et al. | |
| 2003/0065856 A1 | 4/2003 | Kagan et al. | |
| 2003/0120835 A1 | 6/2003 | Kale et al. | |
| 2004/0030745 A1 | 2/2004 | Boucher et al. | |
| 2004/0062258 A1 | 4/2004 | Grow et al. | |
| 2004/0078493 A1 | 4/2004 | Blumrich et al. | |
| 2004/0120331 A1 | 6/2004 | Rhine et al. | |
| 2004/0123071 A1 | 6/2004 | Stefan et al. | |
| 2004/0174820 A1 | 9/2004 | Ricciulli | |
| 2004/0252685 A1 | 12/2004 | Kagan et al. | |
| 2004/0260683 A1 | 12/2004 | Chan et al. | |
| 2005/0097300 A1 | 5/2005 | Gildea et al. | |
| 2005/0122329 A1 | 6/2005 | Janus | |
| 2005/0129039 A1 | 6/2005 | Biran et al. | |
| 2005/0131865 A1 | 6/2005 | Jones et al. | |
| 2005/0223118 A1 | 10/2005 | Tucker et al. | |
| 2005/0281287 A1 | 12/2005 | Ninomi et al. | |
| 2006/0095610 A1 | 5/2006 | Arndt et al. | |
| 2006/0282838 A1 | 12/2006 | Gupta et al. | |
| 2007/0127396 A1 | 6/2007 | Jain et al. | |
| 2007/0127525 A1 | 6/2007 | Sarangam et al. | |
| 2007/0162236 A1 | 7/2007 | Lamblin et al. | |
| 2008/0040792 A1 | 2/2008 | Larson et al. | |
| 2008/0104218 A1 | 5/2008 | Liang et al. | |
| 2008/0126564 A1 | 5/2008 | Wilkinson | |
| 2008/0168471 A1 | 7/2008 | Benner et al. | |
| 2008/0181260 A1 | 7/2008 | Vonog et al. | |
| 2008/0192750 A1 | 8/2008 | Ko et al. | |
| 2008/0219159 A1 | 9/2008 | Chateau et al. | |
| 2008/0244220 A1 | 10/2008 | Lin et al. | |
| 2008/0263329 A1 | 10/2008 | Archer et al. | |
| 2008/0288949 A1 | 11/2008 | Bohra et al. | |
| 2008/0298380 A1 | 12/2008 | Rittmeyer et al. | |
| 2008/0307082 A1 | 12/2008 | Cai et al. | |
| 2009/0037377 A1 | 2/2009 | Archer et al. | |
| 2009/0063816 A1 | 3/2009 | Arimilli et al. | |
| 2009/0063817 A1 | 3/2009 | Arimilli et al. | |
| 2009/0063891 A1 | 3/2009 | Arimilli et al. | |
| 2009/0182814 A1 | 7/2009 | Tapolcai et al. | |
| 2009/0240838 A1 | 9/2009 | Berg et al. | |
| 2009/0247241 A1 | 10/2009 | Gollnick et al. | |
| 2009/0292905 A1 | 11/2009 | Faraj | |
| 2009/0296699 A1 | 12/2009 | Hefty | |
| 2009/0327444 A1 | 12/2009 | Archer et al. | |
| 2010/0017420 A1* | 1/2010 | Archer | G06F 15/17337 707/E17.009 |
| 2010/0049836 A1 | 2/2010 | Kramer | |
| 2010/0074098 A1 | 3/2010 | Zeng et al. | |
| 2010/0095086 A1 | 4/2010 | Eichenberger et al. | |
| 2010/0185719 A1 | 7/2010 | Howard | |

(56) References Cited

U.S. PATENT DOCUMENTS

| | | |
|---|---|---|
| 2010/0241828 A1 | 9/2010 | Yu et al. |
| 2010/0274876 A1 | 10/2010 | Kagan et al. |
| 2010/0329275 A1 | 12/2010 | Johnsen et al. |
| 2011/0060891 A1 | 3/2011 | Jia |
| 2011/0066649 A1 | 3/2011 | Berlyant et al. |
| 2011/0093258 A1 | 4/2011 | Xu et al. |
| 2011/0119673 A1 | 5/2011 | Bloch et al. |
| 2011/0173413 A1 | 7/2011 | Chen et al. |
| 2011/0219208 A1 | 9/2011 | Asaad |
| 2011/0238956 A1 | 9/2011 | Arimilli et al. |
| 2011/0258245 A1 | 10/2011 | Blocksome et al. |
| 2011/0276789 A1 | 11/2011 | Chambers et al. |
| 2012/0063436 A1 | 3/2012 | Thubert et al. |
| 2012/0117331 A1 | 5/2012 | Krause et al. |
| 2012/0131309 A1 | 5/2012 | Johnson |
| 2012/0254110 A1 | 10/2012 | Takemoto |
| 2013/0117548 A1 | 5/2013 | Grover et al. |
| 2013/0159410 A1 | 6/2013 | Lee et al. |
| 2013/0159568 A1 | 6/2013 | Shahar et al. |
| 2013/0215904 A1 | 8/2013 | Zhou et al. |
| 2013/0250756 A1 | 9/2013 | Johri et al. |
| 2013/0312011 A1 | 11/2013 | Kumar et al. |
| 2013/0318525 A1 | 11/2013 | Palanisamy et al. |
| 2013/0336292 A1 | 12/2013 | Kore et al. |
| 2014/0019574 A1 | 1/2014 | Cardona et al. |
| 2014/0033217 A1 | 1/2014 | Vajda et al. |
| 2014/0040542 A1 | 2/2014 | Kim et al. |
| 2014/0047341 A1 | 2/2014 | Breternitz et al. |
| 2014/0095779 A1* | 4/2014 | Forsyth ............... G06F 9/3838 711/105 |
| 2014/0122831 A1 | 5/2014 | Uliel et al. |
| 2014/0136811 A1 | 5/2014 | Fleischer et al. |
| 2014/0189308 A1 | 7/2014 | Hughes et al. |
| 2014/0211804 A1 | 7/2014 | Makikeni et al. |
| 2014/0258438 A1 | 9/2014 | Ayoub |
| 2014/0280420 A1 | 9/2014 | Khan |
| 2014/0281370 A1 | 9/2014 | Khan |
| 2014/0362692 A1 | 12/2014 | Wu et al. |
| 2014/0365548 A1 | 12/2014 | Mortensen |
| 2014/0379714 A1 | 12/2014 | Hankins |
| 2015/0046741 A1 | 2/2015 | Yen et al. |
| 2015/0055508 A1 | 2/2015 | Ashida et al. |
| 2015/0074373 A1 | 3/2015 | Sperber et al. |
| 2015/0106578 A1 | 4/2015 | Warfield et al. |
| 2015/0143076 A1 | 5/2015 | Khan |
| 2015/0143077 A1 | 5/2015 | Khan |
| 2015/0143078 A1 | 5/2015 | Khan et al. |
| 2015/0143079 A1 | 5/2015 | Khan |
| 2015/0143085 A1 | 5/2015 | Khan |
| 2015/0143086 A1 | 5/2015 | Khan |
| 2015/0154058 A1 | 6/2015 | Miwa et al. |
| 2015/0178211 A1 | 6/2015 | Hiramoto et al. |
| 2015/0180785 A1 | 6/2015 | Annamraju |
| 2015/0188987 A1 | 7/2015 | Reed et al. |
| 2015/0193271 A1* | 7/2015 | Archer ............... G06F 9/4843 718/101 |
| 2015/0212972 A1 | 7/2015 | Boettcher et al. |
| 2015/0261720 A1 | 9/2015 | Kagan et al. |
| 2015/0269116 A1 | 9/2015 | Raikin et al. |
| 2015/0278347 A1 | 10/2015 | Meyer et al. |
| 2015/0318015 A1 | 11/2015 | Bose et al. |
| 2015/0347012 A1 | 12/2015 | Dewitt et al. |
| 2015/0365494 A1 | 12/2015 | Cardona et al. |
| 2015/0379022 A1 | 12/2015 | Puig et al. |
| 2016/0055225 A1 | 2/2016 | Xu et al. |
| 2016/0092362 A1 | 3/2016 | Barron et al. |
| 2016/0105494 A1 | 4/2016 | Reed et al. |
| 2016/0112531 A1 | 4/2016 | Milton et al. |
| 2016/0117277 A1 | 4/2016 | Raindel et al. |
| 2016/0119244 A1 | 4/2016 | Wang et al. |
| 2016/0179537 A1 | 6/2016 | Kunzman et al. |
| 2016/0219009 A1 | 7/2016 | French |
| 2016/0246646 A1 | 8/2016 | Craciunas et al. |
| 2016/0248656 A1 | 8/2016 | Anand et al. |
| 2016/0283422 A1 | 9/2016 | Crupnicoff et al. |
| 2016/0294793 A1 | 10/2016 | Larson et al. |
| 2016/0299872 A1 | 10/2016 | Vaidyanathan et al. |
| 2016/0342568 A1 | 11/2016 | Burchard et al. |
| 2016/0352598 A1 | 12/2016 | Reinhardt et al. |
| 2016/0364350 A1 | 12/2016 | Sanghi et al. |
| 2017/0063613 A1 | 3/2017 | Bloch et al. |
| 2017/0093715 A1 | 3/2017 | McGhee et al. |
| 2017/0116154 A1 | 4/2017 | Palmer et al. |
| 2017/0187496 A1 | 6/2017 | Shalev et al. |
| 2017/0187589 A1 | 6/2017 | Pope et al. |
| 2017/0187629 A1 | 6/2017 | Shalev et al. |
| 2017/0187846 A1 | 6/2017 | Shalev et al. |
| 2017/0192782 A1 | 7/2017 | Valentine et al. |
| 2017/0199844 A1 | 7/2017 | Burchard et al. |
| 2017/0262517 A1 | 9/2017 | Horowitz et al. |
| 2017/0308329 A1 | 10/2017 | A et al. |
| 2017/0331926 A1 | 11/2017 | Raveh et al. |
| 2017/0344589 A1 | 11/2017 | Kafai et al. |
| 2018/0004530 A1 | 1/2018 | Vorbach |
| 2018/0046901 A1 | 2/2018 | Xie et al. |
| 2018/0047099 A1 | 2/2018 | Bonig et al. |
| 2018/0089278 A1 | 3/2018 | Bhattacharjee et al. |
| 2018/0091442 A1 | 3/2018 | Chen et al. |
| 2018/0097721 A1 | 4/2018 | Matsui et al. |
| 2018/0115529 A1 | 4/2018 | Munger et al. |
| 2018/0173673 A1 | 6/2018 | Daglis et al. |
| 2018/0262551 A1* | 9/2018 | Demeyer ............... H04L 65/80 |
| 2018/0278549 A1 | 9/2018 | Mula et al. |
| 2018/0285151 A1 | 10/2018 | Wang et al. |
| 2018/0285316 A1 | 10/2018 | Thorson et al. |
| 2018/0287725 A1 | 10/2018 | Rabinovich et al. |
| 2018/0287928 A1 | 10/2018 | Levi et al. |
| 2018/0302324 A1 | 10/2018 | Kasuya |
| 2018/0321912 A1 | 11/2018 | Li et al. |
| 2018/0321938 A1 | 11/2018 | Boswell et al. |
| 2018/0349212 A1* | 12/2018 | Liu ....................... H04L 67/62 |
| 2018/0367465 A1 | 12/2018 | Levi |
| 2018/0375781 A1 | 12/2018 | Chen et al. |
| 2019/0018805 A1 | 1/2019 | Benisty |
| 2019/0026250 A1 | 1/2019 | Das Sarma et al. |
| 2019/0044827 A1 | 2/2019 | Ganapathi et al. |
| 2019/0044875 A1 | 2/2019 | Murty et al. |
| 2019/0044889 A1 | 2/2019 | Serres et al. |
| 2019/0056972 A1 | 2/2019 | Zhou et al. |
| 2019/0065208 A1 | 2/2019 | Liu et al. |
| 2019/0068501 A1 | 2/2019 | Schneder et al. |
| 2019/0102090 A1 | 4/2019 | Guim et al. |
| 2019/0102179 A1 | 4/2019 | Fleming et al. |
| 2019/0102338 A1 | 4/2019 | Tang et al. |
| 2019/0102640 A1 | 4/2019 | Balasubramanian |
| 2019/0114533 A1 | 4/2019 | Ng et al. |
| 2019/0121388 A1* | 4/2019 | Knowles ............... G06F 9/3851 |
| 2019/0124524 A1 | 4/2019 | Gormley |
| 2019/0138638 A1 | 5/2019 | Pal et al. |
| 2019/0141133 A1 | 5/2019 | Rajan et al. |
| 2019/0147092 A1 | 5/2019 | Pal et al. |
| 2019/0149486 A1 | 5/2019 | Bohrer et al. |
| 2019/0149488 A1 | 5/2019 | Bansal et al. |
| 2019/0171612 A1 | 6/2019 | Shahar et al. |
| 2019/0187774 A1 | 6/2019 | Yi et al. |
| 2019/0235866 A1 | 8/2019 | Das Sarma et al. |
| 2019/0278737 A1 | 9/2019 | Kozomora et al. |
| 2019/0303168 A1 | 10/2019 | Fleming, Jr. et al. |
| 2019/0303263 A1 | 10/2019 | Fleming, Jr. et al. |
| 2019/0319730 A1 | 10/2019 | Webb et al. |
| 2019/0324431 A1 | 10/2019 | Cella et al. |
| 2019/0339688 A1 | 11/2019 | Cella et al. |
| 2019/0347099 A1 | 11/2019 | Eapen et al. |
| 2019/0369994 A1 | 12/2019 | Parandeh Afshar et al. |
| 2019/0377580 A1 | 12/2019 | Vorbach |
| 2019/0379714 A1 | 12/2019 | Levi et al. |
| 2020/0005859 A1 | 1/2020 | Chen et al. |
| 2020/0034145 A1 | 1/2020 | Bainville et al. |
| 2020/0057748 A1 | 2/2020 | Danilak |
| 2020/0103894 A1 | 4/2020 | Cella et al. |
| 2020/0106828 A1 | 4/2020 | Elias et al. |
| 2020/0137013 A1* | 4/2020 | Jin ....................... H04L 12/185 |
| 2020/0202246 A1 | 6/2020 | Lin et al. |
| 2020/0265043 A1 | 8/2020 | Graham et al. |

(56) References Cited

U.S. PATENT DOCUMENTS

| | | | |
|---|---|---|---|
| 2020/0274733 A1 | 8/2020 | Graham et al. | |
| 2021/0203621 A1 | 7/2021 | Ylisirnio et al. | |
| 2021/0218808 A1 | 7/2021 | Graham et al. | |
| 2021/0234753 A1 | 7/2021 | Ben-Moshe et al. | |
| 2021/0243140 A1 | 8/2021 | Levi et al. | |
| 2021/0297151 A1 | 9/2021 | Levi et al. | |
| 2022/0006606 A1 | 1/2022 | Levi et al. | |
| 2022/0029854 A1 | 1/2022 | Graham et al. | |
| 2022/0078043 A1 | 3/2022 | Marcovitch et al. | |
| 2022/0188147 A1 | 6/2022 | Nudelman et al. | |
| 2022/0201103 A1 | 6/2022 | Keppel et al. | |
| 2023/0089099 A1 | 3/2023 | Nudelman et al. | |

FOREIGN PATENT DOCUMENTS

| | | |
|---|---|---|
| CN | 109617640 A | 4/2019 |
| WO | 03044677 A1 | 5/2003 |
| WO | 2016150833 A1 | 9/2016 |
| WO | 2016167915 A1 | 10/2016 |

OTHER PUBLICATIONS

Mellanox Technologies Inc., "Scaling 10Gb/s Clustering at Wire-Speed", pp. 1-8, year 2006.
IEEE 802.1D Standard "IEEE Standard for Local and Metropolitan Area Networks—Media Access Control (MAC) Bridges", IEEE Computer Society, pp. 1-281, Jun. 9, 2004.
IEEE 802.1AX Standard "IEEE Standard for Local and Metropolitan Area Networks—Link Aggregation", IEEE Computer Society, pp. 1-163, Nov. 3, 2008.
Turner et al., "Multirate Clos Networks", IEEE Communications Magazine, pp. 1-11, Oct. 2003.
Thayer School of Engineering, "An Slightly Edited Local Copy of Elements of Lectures 4 and 5", Dartmouth College, pp. 1-5, Jan. 15, 1998 http://people.seas.harvard.edu/~jones/cscie129/nu_lectures/lecture11/switching/clos_network/clos_network.html.
"MPI: A Message-Passing Interface Standard," Message Passing Interface Forum, version 3.1, pp. 1-868, Jun. 4, 2015.
Coti et al., "MPI Applications on Grids: a Topology Aware Approach," Proceedings of the 15th International European Conference on Parallel and Distributed Computing (EuroPar'09), pp. 1-12, Aug. 2009.
Petrini et al., "The Quadrics Network (QsNet): High-Performance Clustering Technology," Proceedings of the 9th IEEE Symposium on Hot Interconnects (HotI'01), pp. 1-6, Aug. 2001.
Sancho et al., "Efficient Offloading of Collective Communications in Large-Scale Systems," Proceedings of the 2007 IEEE International Conference on Cluster Computing, pp. 1-10, Sep. 17-20, 2007.
Priest et al., "You've Got Mail (YGM): Building Missing Asynchronous Communication Primitives", IEEE International Parallel and Distributed Processing Symposium Workshops, pp. 221-230, year 2019.
InfiniBand Architecture Specification, vol. 1, Release 1.2.1, pp. 1-1727, Nov. 2007.
Deming, "Infiniband Architectural Overview", Storage Developer Conference, pp. 1-70, year 2013.
Fugger et al., "Reconciling fault-tolerant distributed computing and systems-on-chip", Distributed Computing, vol. 24, Issue 6, pp. 323-355, Jan. 2012.
Wikipedia, "System on a chip", pp. 1-4, Jul. 6, 2018.
Villavieja et al., "On-chip Distributed Shared Memory", Computer Architecture Department, pp. 1-10, Feb. 3, 2011.
Wikipedia, "Nagle's algorithm", pp. 1-4, Dec. 12, 2019.
Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.
Gainaru et al., "Using InfiniBand Hardware Gather-Scatter Capabilities to Optimize MPI All-to-All", EuroMPI '16, Edinburgh, United Kingdom, pp. 1-13, year 2016.
Pjesivac-Grbovic et al., "Performance analysis of MPI collective operations", Cluster Computing, pp. 1-25, year 2007.
Bruck et al., "Efficient Algorithms for All-to-All Communications in Multiport Message-Passing Systems", Proceedings of the sixth annual ACM symposium on Parallel algorithms and architectures, pp. 298-309, Aug. 1, 1994.
Chiang et al., "Toward supporting data parallel programming on clusters of symmetric multiprocessors", Proceedings International Conference on Parallel and Distributed Systems, pp. 607-614, Dec. 14, 1998.
Danalis et al., "PTG: an abstraction for unhindered parallelism", 2014 Fourth International Workshop on Domain-Specific Languages and High-Level Frameworks for High Performance Computing, pp. 1-10, Nov. 17, 2014.
Cosnard et al., "Symbolic Scheduling of Parameterized Task Graphs on Parallel Machines," Combinatorial Optimization book series (COOP, vol. 7), pp. 217-243, year 2000.
Jeannot et al., "Automatic Multithreaded Parallel Program Generation for Message Passing Multiprocessors using paramerized Task Graphs", World Scientific, pp. 1-8, Jul. 23, 2001.
Stone, "An Efficient Parallel Algorithm for the Solution of a Tridiagonal Linear System of Equations," Journal of the Association for Computing Machinery, vol. 10, No. 1, pp. 27-38, Jan. 1973.
Kogge et al., "A Parallel Algorithm for the Efficient Solution of a General Class of Recurrence Equations," IEEE Transactions on Computers, vol. C-22, No. 8, pp. 786-793, Aug. 1973.
Hoefler et al., "Message Progression in Parallel Computing—To Thread or not to Thread?", 2008 IEEE International Conference on Cluster Computing, pp. 1-10, Tsukuba, Japan, Sep. 29-Oct. 1, 2008.
Wikipedia, "Loop unrolling," pp. 1-9, last edited Sep. 9, 2020 downloaded from https://en.wikipedia.org/wiki/Loop_unrolling.
Chapman et al., "Introducing OpenSHMEM: SHMEM for the PGAS Community," Proceedings of the Forth Conferene on Partitioned Global Address Space Programming Model, pp. 1-4, Oct. 2010.
Yang et al., "SwitchAgg: A Further Step Toward In-Network Computing," 2019 IEEE International Conference on Parallel & Distributed Processing with Applications, Big Data & Cloud Computing, Sustainable Computing & Communications, Social Computing & Networking, pp. 36-45, Dec. 2019.
Pacheco, "A User's Guide to MPI," Department of Mathematics, University of San Francisco, CA, USA, pp. 1-51, Mar. 30, 1998.
Wikipedia, "Message Passing Interface," pp. 1-16, last edited Nov. 7, 2021, as downloaded from https://en.wikipedia.org/wiki/Message_Passing_Interface.
"Message Passing Interface (MPI): History and Evolution," Virtual Workshop, Cornell University Center for Advanced Computing, NY, USA, pp. 1-2, year 2021, as downloaded from https://cvw.cac.cornell.edu/mpi/history.
Xu et al., "SLOAVx: Scalable LOgarithmic AlltoallV Algorithm for Hierarchical Multicore Systems", 13th IEEE/ACM International Symposium on Cluster, Cloud, and Grid Computing, pp. 369-376, year 2013.
Nvidia Corporation, "Nvidia Scalable Hierarchical Aggregation and Reduction Protocol (SHARP)," Rev. 3.0.0, pp. 1-3, year 2023.
Graham, U.S. Appl. No. 18/074,563, filed Dec. 5, 2022.
Graham, U.S. Appl. No. 18/105,846, filed Feb. 5, 2023.
Graham, U.S. Appl. No. 63/356,923, filed Jun. 29, 2022.
Oltchik et al, U.S. Appl. No. 18/451,134, filed Aug. 17, 2023.
CN Application # 202110742521.4 Office Action dated Jan. 30, 2024.
EP Patent Application 20156490.3 Office Action dated Feb. 27, 2024.
IEEE Standard 1588-2008, "IEEE Standard for a Precision Clock Synchronization Protocol for Networked Measurement and Control Systems", pp. 1-289, year 2008.
Weibel et al., "Implementation and Performance of Time Stamping Techniques", 2004 Conference on IEEE 1588, pp. 1-29, Sep. 28, 2004.

(56) References Cited

OTHER PUBLICATIONS

InfiniBandTM Architecture Specification vol. 1, Release 1.2.1, pp. 1-1727, Nov. 2007.

Lu et al., "A Fast CRC Update Implementation", Computer Engineering Laboratory, Electrical Engineering Department, pp. 113-120, Oct. 8, 2003.

Mellette et al., "Toward Optical Switching in the Data Center", IEEE 19th International Conference on High Performance Switching and Routing (HPSR), pp. 1-6, Bucharest, Romania, Jun. 18-20, 2018.

Bakopoulos et al., "NEPHELE: an end-to-end scalable and dynamically reconfigurable optical architecture for application-aware SDN cloud datacenters", IEEE Communications Magazine, vol. 56, issue 2, pp. 1-26, Feb. 2018.

O-RAN Alliance, "O-RAN Fronthaul Working Group; Control, User and Synchronization Plane Specification", ORAN-WG4.CUS. 0-v01.00, Technical Specification, pp. 1-189, year 2019.

Vattikonda et al., "Practical TDMA for Datacenter Ethernet", EuroSys conference, Bern, Switzerland, pp. 225-238, Apr. 10-13, 2012.

Ericsson AB et al., "Common Public Radio Interface: eCPRI Interface Specification", V2.0, pp. 1-109, May 10, 2019.

Xilinx Inc., "Radio over Ethernet Framer v2.1", PB056 (v2.1), pp. 1-9, Oct. 30, 2019.

Weibel, H., "High Precision Clock Synchronization according to IEEE 1588 Implementation and Performance Issues", Zurich University of Applied Sciences, pp. 1-9, Jan. 17, 2005.

Sanchez-Palencia, J., "[RFC,v3,net-next,00/18] Time based packet transmission", pp. 1-14, Mar. 7, 2018.

IEEE Std 802.1Qaz™, "IEEE Standard for Local and metropolitan area networks—Media Access Control (MAC) Bridges and Virtual Bridged Local Area Networks—Amendment 18: Enhanced Transmission Selection for Bandwidth Sharing Between Traffic Classes", IEEE Computer Society, pp. 1-110, Sep. 30, 2011.

Crupnicoff et al., "Deploying Quality of Service and Congestion Control in InfiniBand-based Data Center Networks" White Paper, Mellanox Technologies Inc, Rev 1.0, pp. 1-19, Oct. 15, 2005.

Mathey et al., "Scalable Deadlock-Free Deterministic Minimal-Path Routing Engine for InfiniBand-Based Dragonfly Networks", IEEE Transactions on Parallel and Distributed Systems, vol. 29, No. 1, pp. 183-197, Jan. 2018.

Wikipedia, Precision Time Protocol, pp. 1-9, Apr. 20, 2020.

SMPTE Standard, "Professional Media Over Managed IP Networks: Traffic Shaping and Delivery Timing for Video", The Society of Motion Picture and Television Engineers, pp. 1-17, Nov. 22, 2017.

Wikipedia, "Time-Sensitive Networking", pp. 1-12, Mar. 5, 2020.

Wikipedia, "Memory Protection," pp. 1-6, last edited May 23, 2021.

Mills, "Network Time Protocol (NTP)," RFC 0958, pp. 2-15, Sep. 1985.

Mills, "Network Time Protocol (Version 1): Specification and Implementation," RFC 1059, pp. 2-59, Jul. 1988.

Mills, "Internet Time Synchronization: The Network Time Protocol," IEEE Transactions on Communication, vol. 39, No. 10, pp. 1482-1493, Oct. 1991.

Mills, "Network Time Protocol (Version 3): Specification, Implementation and Analysis," RFC 1305, pp. 1-96, Mar. 1992.

* cited by examiner

| Process 0 | Process 1 | Process 2 | Process 3 | Process 4 | Process 5 |
|---|---|---|---|---|---|
| 0,0 | 1,0 | 2,0 | 3,0 | 4,0 | 5,0 |
| 0,1 | 1,1 | 2,1 | 3,1 | 4,1 | 5,1 |
| 0,2 | 1,2 | 2,2 | 3,2 | 4,2 | 5,2 |
| 0,3 | 1,3 | 2,3 | 3,3 | 4,3 | 5,3 |
| 0,4 | 1,4 | 2,4 | 3,4 | 4,4 | 5,4 |
| 0,5 | 1,5 | 2,5 | 3,5 | 4,5 | 5,5 |

FIG. 6

| Process 0 | Process 1 | Process 2 | Process 3 | Process 4 | Process 5 |
|---|---|---|---|---|---|
| 0,0 | 0,1 | 0,2 | 0,3 | 0,4 | 0,5 |
| 1,0 | 1,1 | 1,2 | 1,3 | 1,4 | 1,5 |
| 2,0 | 2,1 | 2,2 | 2,3 | 2,4 | 2,5 |
| 3,0 | 3,1 | 3,2 | 3,3 | 3,4 | 3,5 |
| 4,0 | 4,1 | 4,2 | 4,3 | 4,4 | 4,5 |
| 5,0 | 5,1 | 5,2 | 5,3 | 5,4 | 5,5 |

FIG. 7

| Process 0 | Process 1 | Process 2 | Process 3 | Process 4 | Process 5 |
|---|---|---|---|---|---|
| 0,0 [a] | 1,0 [b] | 2,0 [b] | 3,0 [a] | 4,0 [e] | 5,0 [e] |
| 0,1 [c] | 1,1 [d] | 2,1 [d] | 3,1 [c] | 4,1 [f] | 5,1 [f] |
| 0,2 [c] | 1,2 [d] | 2,2 [d] | 3,2 [c] | 4,2 [f] | 5,2 [f] |
| 0,3 [a] | 1,3 [b] | 2,3 [b] | 3,3 [a] | 4,3 [e] | 5,3 [e] |
| 0,4 [g] | 1,4 [h] | 2,4 [h] | 3,4 [g] | 4,4 [i] | 5,4 [i] |
| 0,5 [g] | 1,5 [h] | 2,5 [h] | 3,5 [g] | 4,5 [i] | 5,5 [i] |

FIG. 8

COLLECTIVE COMMUNICATION SYSTEM AND METHODS

CROSS-REFERENCE TO RELATED APPLICATIONS

The present application is a continuation of U.S. patent application Ser. No. 17/495,824, filed Oct. 7, 2021, which is a continuation of U.S. patent application Ser. No. 16/789,458, filed Feb. 13, 2020 (now U.S. Pat. No. 11,196,586), which claims the benefit of U.S. Provisional Patent Application 62/809,786, filed Feb. 25, 2019.

FIELD OF THE INVENTION

The present invention, in exemplary embodiments thereof, relates to collective communication systems and methods, and particularly but not exclusively to message passing operations, and also particularly but not exclusively to all-to-all operations.

SUMMARY OF THE INVENTION

The present invention, in certain embodiments thereof, seeks to provide improved systems and methods for collective communication, and in particular, but not only, for message passing operations, including all-to-all operations.

There is thus provided in accordance with an exemplary embodiment of the present invention a method including providing a plurality of processes, each of the plurality of process being configured to hold a block of data destined for others of the plurality of processes, providing at least one instance of data repacking circuitry including receiving circuitry configured to receive at least one block of data from at least one source process of the plurality of processes, repacking circuitry configured to repack received data in accordance with at least one destination process of the plurality of processes, and sending circuitry configured to send the repacked data to the at least one destination process of the plurality of processes, receiving a set of data for all-to-all data exchange, the set of data being configured as a matrix, the matrix being distributed among the plurality of processes, and transposing the data by each of the plurality of processes sending matrix data from the process to the repacking circuitry, and the repacking circuitry receiving, repacking, and sending the resulting matrix data to destination processes.

Further in accordance with an exemplary embodiment of the present invention the method also includes providing a control tree configured to control the plurality of processes and the repacking circuitry.

Still further in accordance with an exemplary embodiment of the present invention the control tree is further configured to receive registration messages from each of the plurality of processes, mark a given subgroup of the plurality of processes as ready for operation when registration messages have been received from all members of the given subgroup, when a given subgroup which is a source subgroup and a corresponding subgroup which is a destination subgroup are ready for operation, pair the given source subgroup and the given destination subgroup and assign the given source subgroup and the given destination subgroup to an instance of repacking circuitry, and notify each the source subgroup and each the destination subgroup when operations relating to each the source subgroup and each the destination subgroup have completed.

Additionally in accordance with an exemplary embodiment of the present invention the control tree is configured, in addition to pairing the given source subgroup and the given destination subgroup, to assign the given source subgroup and the given destination subgroup to an instance of data repacking circuitry.

Moreover in accordance with an exemplary embodiment of the present invention the method also includes assigning circuitry other than the control tree, the assigning circuitry being configured to assign the given source subgroup and the given destination subgroup to an instance of data repacking circuitry.

Further in accordance with an exemplary embodiment of the present invention the control tree includes a reduction tree.

There is also provided in accordance with another exemplary embodiment of the present invention apparatus including receiving circuitry configured to receive at least one block of data from at least one source process of a plurality of processes, each of the plurality of process being configured to hold a block of data destined for others of the plurality of processes, at least one instance of data repacking circuitry configured to repack received data in accordance with at least one destination process of the plurality of processes, and sending circuitry configured to send the repacked data to the at least one destination process of the plurality of processes, the apparatus being configured to receive a set of data for all-to-all data exchange, the set of data being configured as a matrix, the matrix being distributed among the plurality of processes, and the apparatus being further configured to transpose the data by receiving, from each of the plurality of processes, matrix data from the process at the repacking circuitry, and the data repacking circuitry receiving, repacking, and sending the resulting matrix data to destination processes.

Further in accordance with an exemplary embodiment of the present invention the apparatus also includes a control tree configured to control the plurality of processes and the repacking circuitry.

Still further in accordance with an exemplary embodiment of the present invention the control tree is further configured to receive registration messages from each of the plurality of processes, mark a given subgroup of the plurality of processes as ready for operation when registration messages have been received from all members of the given subgroup, when a given subgroup which is a source subgroup and a corresponding subgroup which is a destination subgroup are ready for operation, pair the given source subgroup and the given destination subgroup and assign the given source subgroup and the given destination subgroup to an instance of data repacking circuitry, and notify each the source subgroup and each the destination subgroup when operations relating to each source subgroup and each destination subgroup have completed.

Additionally in accordance with an exemplary embodiment of the present invention the control tree is configured, in addition to pairing the given source subgroup and the given destination subgroup, to assign the given source subgroup and the given destination subgroup to a given instance of data repacking circuitry.

Moreover in accordance with an exemplary embodiment of the present invention the apparatus also includes assigning circuitry other than the control tree, the assigning circuitry being configured to assign the given source subgroup and the given destination subgroup to a given instance of data repacking circuitry.

Further in accordance with an exemplary embodiment of the present invention the control tree includes a reduction tree.

BRIEF DESCRIPTION OF THE DRAWINGS

The present invention will be understood and appreciated more fully from the following detailed description, taken in conjunction with the drawings in which:

FIG. 6 is a simplified pictorial illustration depicting initial block distribution for an all-to-all operation, in accordance with an exemplary embodiment of the present invention;

FIG. 7 is a simplified pictorial illustration depicting final block distribution for an all-to-all operation, in accordance with an exemplary embodiment of the present invention;

FIG. 8 is a simplified pictorial illustration depicting all-to-all submatrix distribution, in accordance with another exemplary embodiment of the present invention.

DETAILED DESCRIPTION OF AN EMBODIMENT

The all-to-all operation, defined in communication standards such as the Message Passing Interface (MPI) (Forum, 2015), is a collective data operation in which each process sends data to every other process in the collective group, and receives the same amount of data from each process in the group. The data sent to each process is of the same length, a, and is unique, originating from distinct memory locations. In communications standards such as MPI, the concept of operations on processes is decoupled from any particular hardware infrastructure. A collective group, as discussed herein, refers to a group of processes over which a (collective) operation is defined. In the MPI specification a collective group is called a "communicator", while in OpenSHMEM (see, for example, www.openshmem.org/site/) a collective group is called a "team".

Figure 1A:
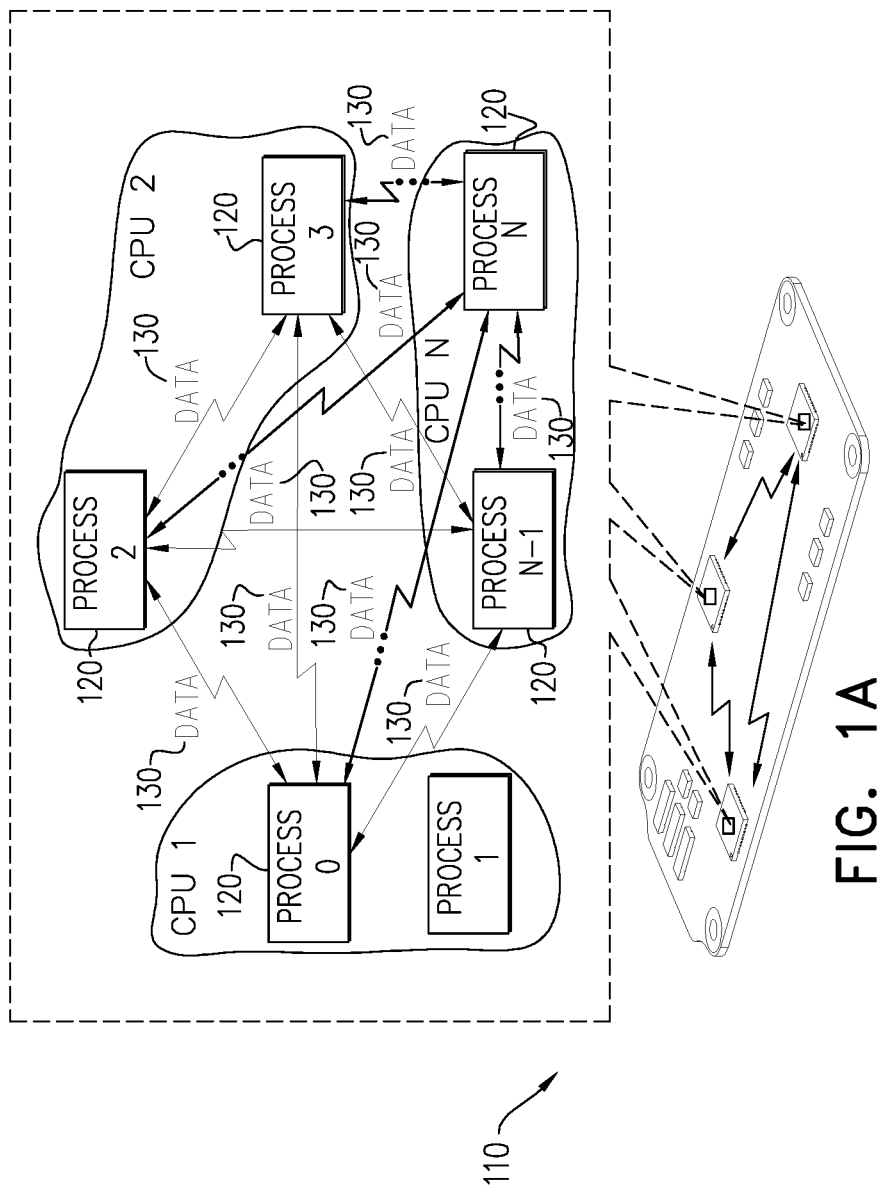
FIG. 1A is a simplified pictorial illustration of an exemplary computer system, constructed and operative in accordance with an exemplary embodiment of the present invention.

Reference is now made to FIG. 1A, which is a simplified pictorial illustration of an exemplary computer system, constructed and operative in accordance with an exemplary embodiment of the present invention. The system of FIG. 1A, generally designated 110, comprises a plurality of processes 120, with data (typically data blocks) 130 flowing therebetween. The term "data blocks" (in various grammatical forms) as used herein refers to data the data sent from a member (process, rank, . . . ) i to a member j within a collective group. It is appreciated, as also explained elsewhere herein, For alltoall the size of all blocks is the same (and can be 0), while for alltoallv/w no uniformity is the size of the data blocks is assumed, and some/all of the blocks may be 0.

Exemplary methods of operation of the system of FIG. 1A are described below. In FIG. 1A, by way of non-limiting example, a plurality of CPUs (comprising CPU 1, CPU 2, and CPU N), interconnected in a system-on-chip are shown running the plurality of processes 120. Other system examples, by way of non-limiting example, include: a single CPU; a plurality of systems or servers connected by a network; or any other appropriate system. As described above, the concept of operations on processes, as described herein, is decoupled from any particular hardware infrastructure, although it is appreciated that in any actual implementation some hardware infrastructure (as shown in FIG. 1A or otherwise as described above) would be used.

Figure 1B:
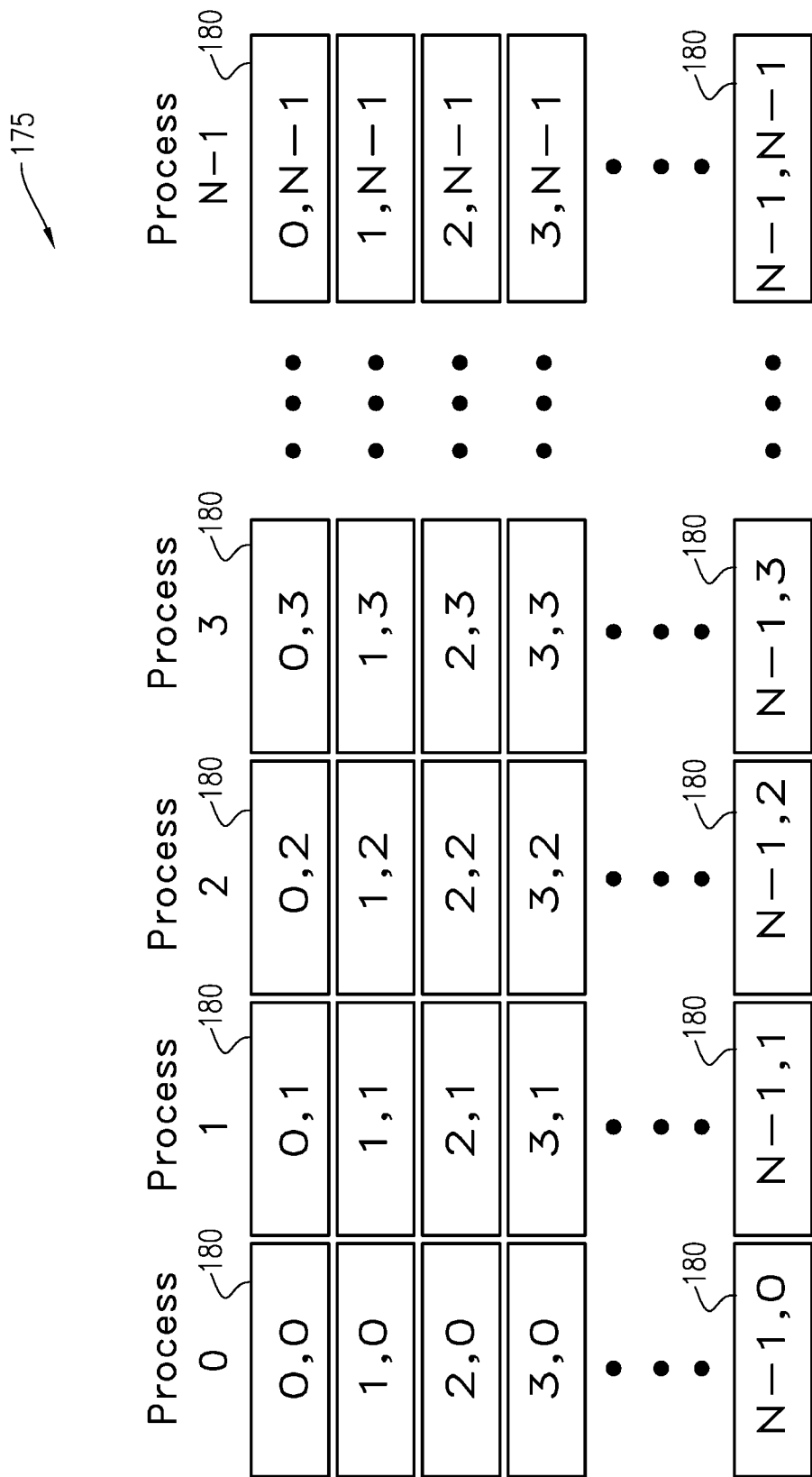
FIG. 1B is a simplified pictorial illustration of an exemplary data block layout.
Figure 2:
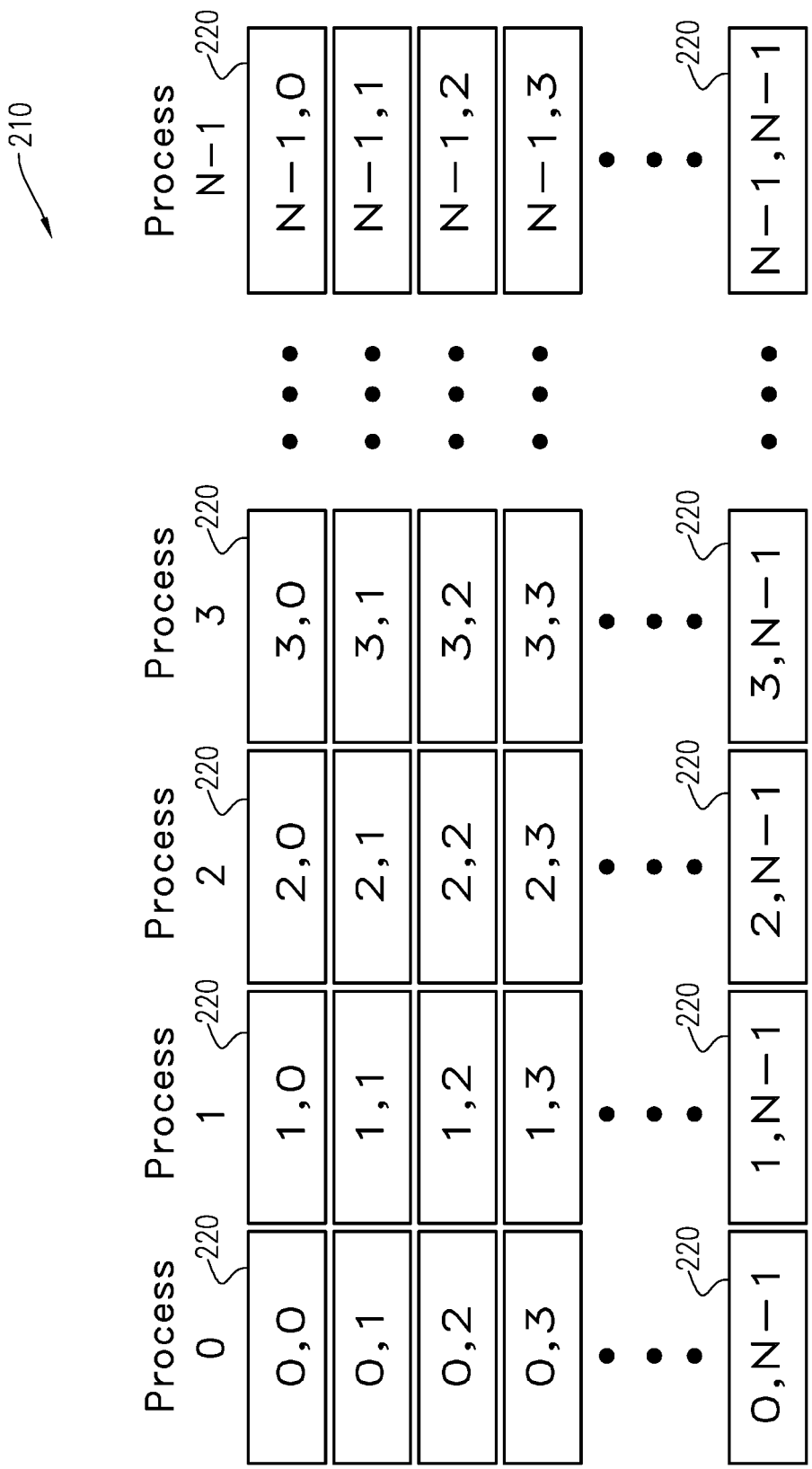
FIG. 2 is a simplified pictorial illustration of another exemplary data block layout.

Reference is now made to FIG. 1B, which is a simplified pictorial illustration of an exemplary data block layout 175 comprising a plurality of data blocks 180, and to FIG. 2, which is a simplified pictorial illustration of another exemplary data block layout 210 comprising a plurality of data blocks 220. FIG. 1B shows the exemplary data block layout 175 before an all-to-all operation is applied, while FIG. 2 shows a corresponding data bock layout 210 after the all-to-all operation is applied. Each data block 180 in FIG. 1B and each data block 220 in FIG. 2 corresponds to a vector of length a.

The algorithms used to implement the all-to-all algorithm tend to fall into two categories—direct exchange and aggregation algorithms.

All-to-all aggregation algorithms are aimed at reducing latency costs, which dominate short data transfers. The all-to-all aggregation algorithms employ data forwarding approaches, to cut down on the number of messages sent, thus reducing latency costs. Such approaches gather/scatter the data from/to multiple sources, producing fewer larger data transfers, but send a given piece of data multiple times. As the number of communication contexts participating in the collective operation becomes too large, aggregation techniques become less efficient than a direct data exchange; this is due to the growing cost of transferring a given piece of data multiple times. The all-to-all algorithms take advantage of the fact that the data length a is a constant of the algorithm, providing sufficient global knowledge to coordinate data exchange through intermediate processes.

The direct exchange algorithms are typically used for all-to-all instances where the length of data being transferred, a, is above a threshold where bandwidth contributions dominate, or when the aggregation techniques aggregate data from too many processes, causing the aggregation techniques to be inefficient.

With growing system sizes, the need to support efficient implementations of small data all-to-all exchanges is increasing, as this is a data exchange pattern used by many High-Performance Computing (HPC) applications. The present invention, in exemplary embodiments thereof, presents a new all-to-all algorithm designed to increase the efficiency of small data exchanges over the full range of communicator sizes. This includes a new aggregation-based algorithm suitable for small data individualized all-to-all data exchange and may be viewed as transposing a distributed matrix. While reference to transposing, in various grammatical forms, are used throughout the present specification and claims, it is appreciated that transposing comprises a way to conceptualize algorithms in accordance with exemplary embodiments of the present invention; for example and without limiting the generality of the foregoing statement, there may be no such conceptualization at the level of (for example) the MPI standard. Such transposing comprises, in exemplary embodiments, changing the position of blocks relative to other blocks, without changing the structure within any block. The algorithms described herein with reference to exemplary embodiments of the present invention benefit from the large amount of concurrency available in the network and are designed to be simple and efficient for implementation by network hardware. Both switching hardware and Host-Channel-Adapter implementations are, in exemplary embodiments, targeted by this new design.

The individualized all-to-all-v/w algorithm is in certain respects similar to the individualized all-to-all data exchange. The individualized all-to-all-w algorithm differs from the all-to-all-v algorithm, in that the data type of each individual transfer may be unique across the function. A change is made to the all-to-all algorithm to support this collective operation. More specifically regarding data type: data being transferred using the MPI standard's interface specified a data type for all data, such as MPI DOUBLE for a double precision word. The alltoallv interface specifies that all data elements are of the same data type. Alltoallw allows a different data type to be specified for each block of data, such as, for example, specifying a data type for data going from process i to process j.

The all-to-all-v/w operation is used for each process to exchange unique data with every other process in the group of processes participating in this collective operation. The size of data exchanged between two given processes may be asymmetric, and each pair may have a different data pattern than other pairs, with large variations in the data sizes being exchanged. A given rank need only have local, API-level information on the data exchanges in which it participates.

The individualized all-to-all-v/w algorithm aimed at the hardware implementation is somewhat similar to the individualized all-to-all algorithm, but requires more meta-data describing the detailed data lengths for implementation. In addition, only messages below a prespecified threshold are handled with this algorithm A direct data exchange is used for the larger messages.

Previously, the algorithms for all-to-all function implementation have fallen into two broad categories:
Direct data exchange
Aggregation algorithms The base algorithm definition describes data exchange between all pairs of processes in the collective group, or MPI communicator in the MPI definition. The term "base algorithm" refers to an algorithm definition at the interface level—logically what the function is/does, not how the function result is accomplished. Thus, by way of particular non-limiting example, the base description for alltoallv would be each process sending a block of data to all processes in the group. In certain exemplary embodiments of the present invention, by way of particular non-limiting example, methods are described for carrying out particular functions by aggregating data and by using communication patterns described herein. In general, the algorithm definition conceptually requires $O(N^2)$ data exchanges, where N is the group size.

Figure 3:
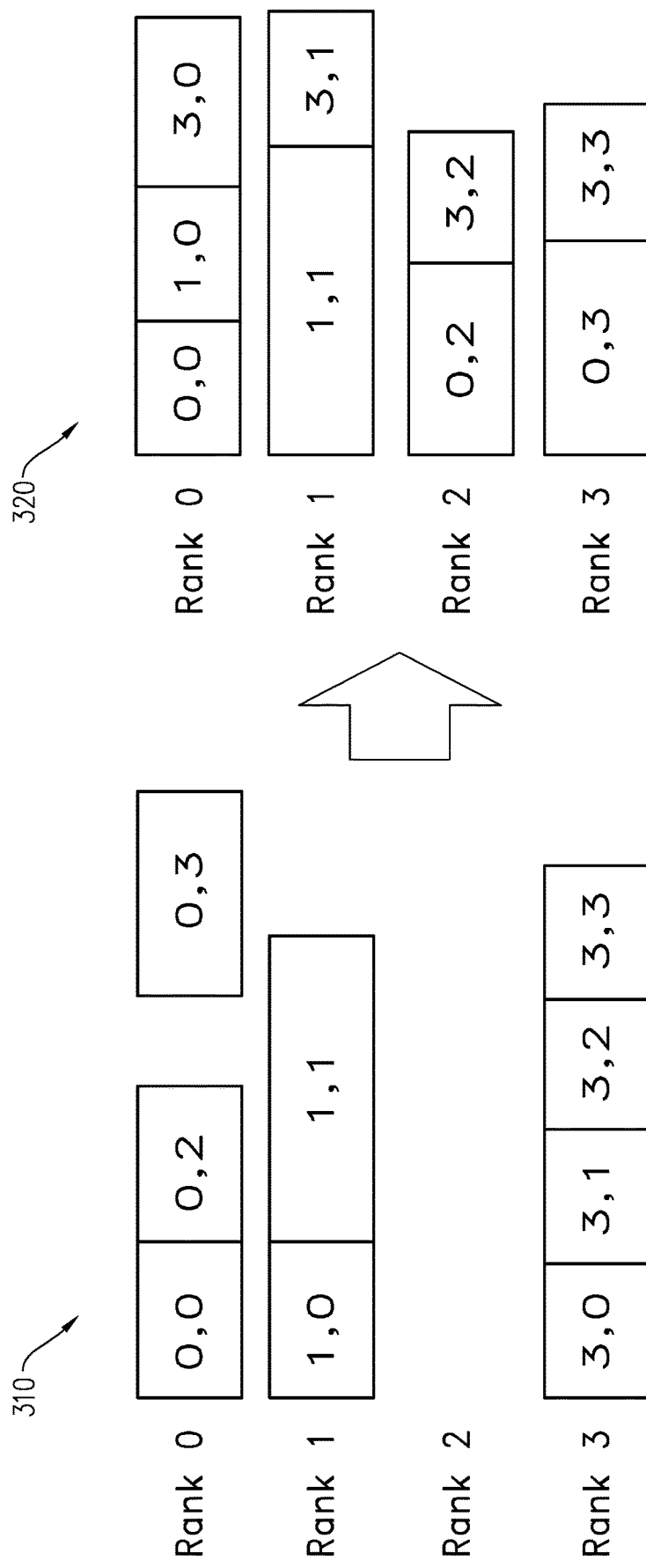
FIG. 3 is a simplified pictorial illustration depicting all-to-all-v initial and final stages.

Reference is now made to FIG. 3, which is a simplified pictorial illustration depicting all-to-all-v initial and final stages.

FIG. 3 provides an example of an individualized all-to-all-v, showing initial (reference numeral 310) and final (reference numeral 320) stages. In FIG. 3 notation (i,j) indicates a data segment that started on rank i at position j and should be transferred to rank j at position i. Data sizes of all segments may vary (and even be zero length). Offset of send and receive locations may also vary.

Figure 4:
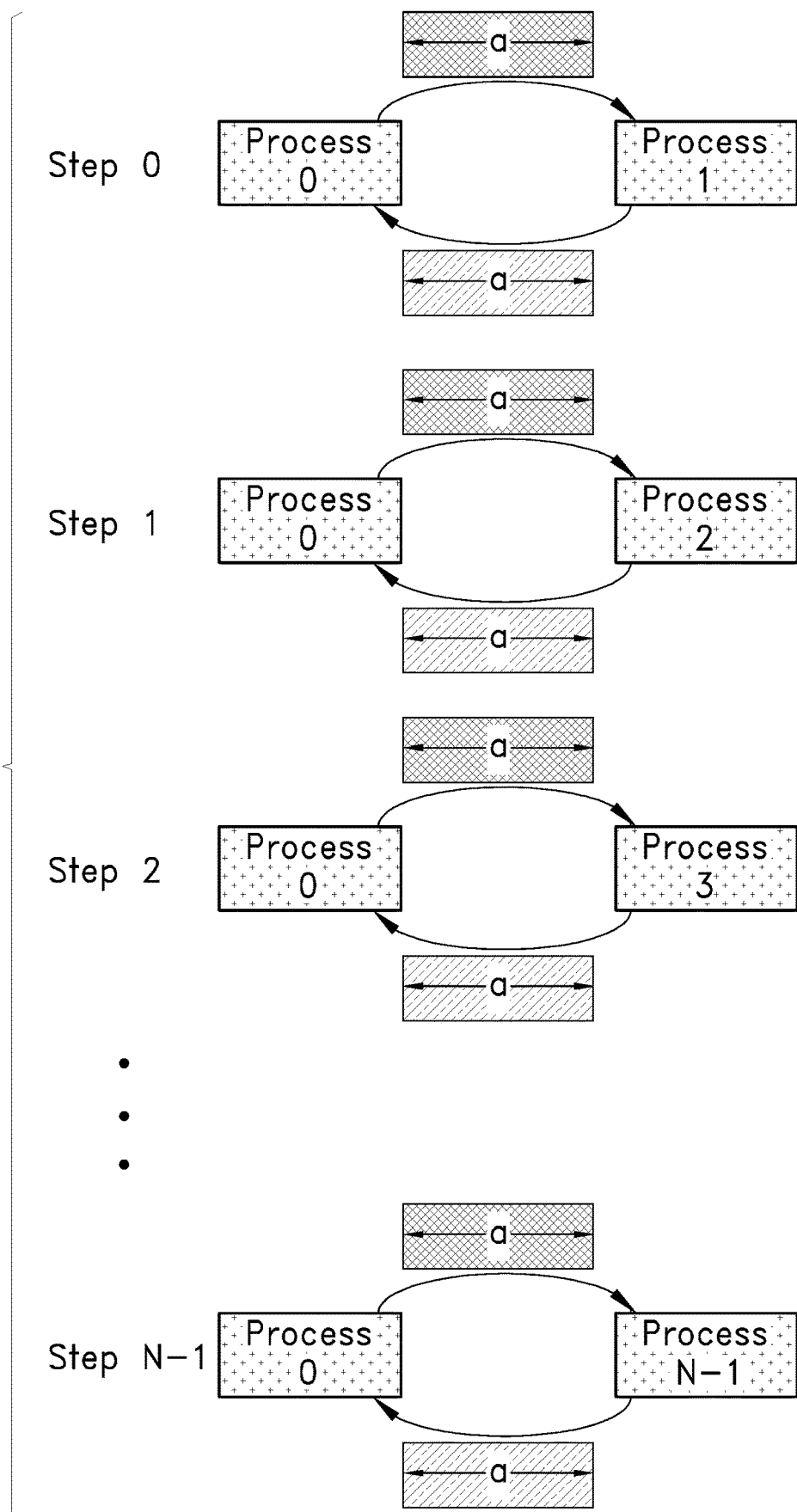
FIG. 4 is a simplified pictorial illustration depicting direct pairwise exchange.

The direct data exchange implementation of the function is the simplest implementation of the all-to-all function. A naïve implementation puts many messages on the network and has the potential to severely degrade network utilization by causing congestion and end-point n→1 contention. (The term "end-point", as used herein, denotes an entity, such as a process or thread, which contributes data to a collective operation). As a result, algorithms that implement the direct data exchange use a communication pattern, such as pairwise exchange, as shown in FIG. 4, (Jelena Pjevsivac-Grbovic, 2007), to reduce network load and end-point contention. For large message exchange, which is bandwidth limited, direct data exchange algorithms tend to make good use of network resources. However, when data exchanges are small, latency and message rate costs dominate overall algorithm costs, scale linearly with the N, and do not make good use of system resources. Specifically, FIG. 4 depicts a non-limiting example of direct pair-wise exchange pattern for exchanges involving process 0. The length of each exchange is a, with a bi-directional data exchange.

Figure 5:
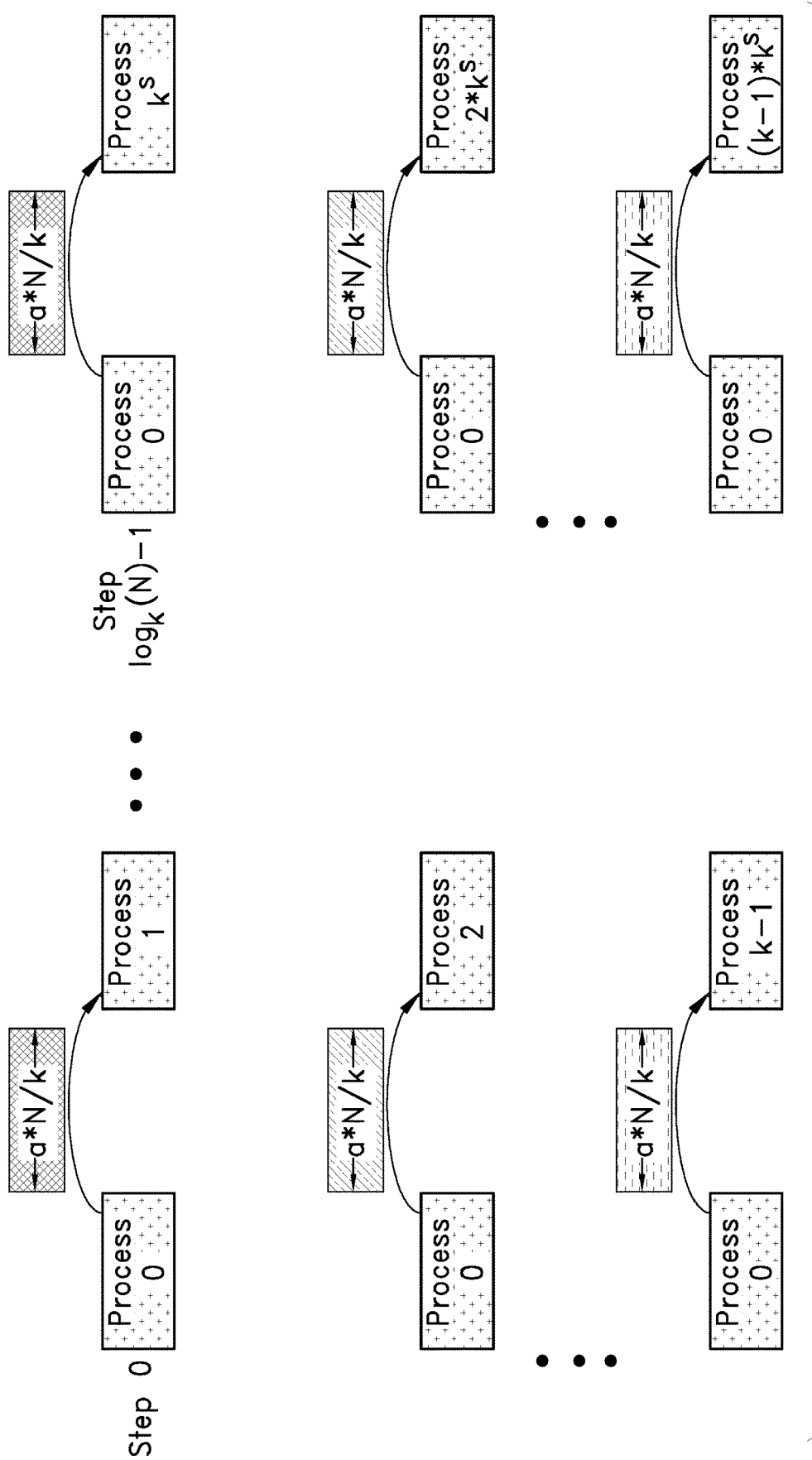
FIG. 5 is a simplified pictorial illustration depicting an aggregation algorithm.

Aggregation algorithms (Ana Gainaru, 2016) have been used to implement the small data aggregation, with the Bruck (J. Bruck, 1997) algorithm being perhaps the most well-known algorithm in this class. The number of data exchanges in which each process is involved using this approach is $O((k-1)*\log_k(N))$, where N is the collective groups size and k is the algorithm radix. FIG. 5 shows the communication pattern for one possible aggregation pattern. Specifically, FIG. 5 depicts a non-limiting example of an aggregation algorithm sending a side data pattern for arbitrary radix k, assuming N is an integer power of the algorithm radix k. N is the size of the collective group. The aggregation algorithms provide better scalability characteristics than the direct exchange. The reduction in the number of messages reduces the latency and message rate costs of the all-to-all operation but increases bandwidth-related costs. If the group does not get too large, the aggregation algorithms outperform direct-exchange algorithms. The message size of each data exchange in the aggregation algorithms scales as $O(a*N/k)$, where a is the all-to-all function message size. As a result, when groups become large, aggregation algorithms are ineffective at reducing the latency of the all-to-all data exchange and will cause the latency to exceed that of the direct data exchange algorithms.

In exemplary embodiments of the present invention, the all-to-all and all-to-all-v/w algorithm is aimed at optimizing the small data exchange by:
1. Defining multiple aggregation points in the network, either switches or Host Channel Adapters (HCAs).
2. Assigning aggregation points for data from sub-blocks of the processes destined to the same or other sub-blocks of the processes to individual aggregators within the network infrastructure. This data may be viewed as a sub-matrix of the distributed matrix. A single aggregator may handle multiple blocks of the submatrix from a single individualized all-to-all or all-to-all-v/w algorithm
3. The sub-blocks may be formed by discontinuous groups of processes, which are in certain exemplary embodiments formed on-the-fly to handle load imbalance in the calling application. In such a case, the matrix sub-blocks may be non-contiguous.

4. The term "aggregator" is used herein to refer to an entity which aggregates a sub-matrix, transposes the same, and then sends results to their final destination. In certain exemplary embodiments of the present invention, the aggregator is a logic block within an HCA. Then the present step 4 may comprise having the aggregator:
   a. Gather data from all the sources.
   b. Shuffle the data to prepare so that data destined to a specific process may be sent in as a single message to this destination. The term "shuffle" in the present context refers to re-ordering incoming data from different source processes, such that data destined to a given destination can be conveniently handled. In certain exemplary embodiments of the present invention, data to a single destination may be copied to one contiguous memory block.
   c. Send the data to the destinations.
5. Data discontinuity and the data source and/or destination is, in certain preferred embodiments, handled at the network edge, so that the aggregators handle only contiguous packed data. That is, data sent from a user or received by a user does not need to be contiguous in the user's virtual memory space; this situation can be conceived like faces of a cube, in which 2 of the 6 faces will not be in contiguous memory addresses. Hardware sends streams of contiguous data. Handling the non-contiguous→contiguous "packing" is done at the first step (either by using the CPU to pack the data into a contiguous buffer, or by using HCA gather capabilities). Similarly, unpacking non-contiguous data into user buffers can be done either by the HCA delivering the data to a contiguous destination buffer, and then using the CPU to unpack, or by using the HCA scatter capabilities. Thus, algorithmic data manipulation in the intermediate steps may treat contiguous, packed data.

The present invention, in exemplary embodiments thereof, may be viewed as using aggregation points within the network to collect data from a non-contiguous portion of a distributed matrix, transpose the data, and send the data to their destinations.

In exemplary embodiments, the invention may be summarized as follows:
1. Data layout is viewed as a distributed matrix, with each process holding a block of data destined to each other process. For the all-to-all algorithm, the data block size is the same for all source data blocks; while for all-to-all-v/w, the data block sizes may be of different lengths, including length zero. In notation used herein, the horizontal index indicates the data source and the vertical index its destination.
2. The collective operation performs a transpose of the data blocks.
3. To transpose the distributed matrix, the matrix is subdivided into rectangular submatrices, of dimension $d_h \times d_v$, where $d_h$ is the size in the horizontal dimension and $d_v$ is the size in the vertical dimension. Subblocks need not be logically contiguous. The submatrices may be predefined, or may be determined at run-time based on some criteria, such as, by way of non-limiting example, an order of entry into the all-to-all operation.
4. Provide a data repacking unit, which accepts data from a specified set of sources, the data being destined to a specified set of destinations, repacks the data by destination, and sends the data to the specified destinations. In exemplary embodiments, the data repacking unit has subunits for each operation described. In certain exemplary embodiments of the present invention, an aggregator, as described herein, would comprise or make use of a data repacking unit.
5. The transposition of a submatrix is assigned to a given data repacking unit, with each unit being assigned multiple submatrices to transpose. In certain exemplary embodiments of the present invention, the assignment may be carried out by the control tree mentioned below in point 7; alternatively another component (such as, by way of non-limiting example, a software component) may be provided to carry out the assignment.
6. The data repacking unit may be implemented as appropriate within the system. For example, it may be implemented in a switch ASIC, Host-Channel-Adapter (HCA) unit, CPU or other appropriate hardware, and may be implemented in hardware, firmware, software, or in any appropriate combination thereof.
7. A reduction tree is used as a control tree to control the collective operation, in the following manner:
   7.1. Each process in the group registers itself with the control tree, by passing up an arrival notification to the control tree.
   7.2. Once all members of a subgroup arrive, the subgroup is marked as ready for operation (ready for send/receive).
   7.3. As source and destination group of a given submatrix are ready, the relevant data repacking unit schedules the data movement.
   7.4. Data is transferred from the source processes to the data repacking unit. This unit repacks the data and sends it to the appropriate destinations.
   7.5. Each source process is notified of completion, as is each destination process. In certain exemplary embodiments of the present invention, this is accomplished by the aggregator notifying the source and destination blocks of completion; by way of particular non-limiting example, this may be accomplished using the control tree.
   7.6. The operation completes locally at each process, once all expected data has been received, and transferring all source data is complete.

In exemplary embodiments, a more detailed explanation is as follows:

In all-to-all and all-to-all-v/w algorithms, each process has a unique block of data destined for each other process in the group. The primary way all-to-all differs from all-to-all-v is in the data layout pattern. All-to-all data blocks are all of the same size, whereas the all-to-all-v/w algorithms support data blocks of differing sizes, and the data blocks need not be ordered in a monotonically increasing order within the user buffer.

The layout of blocks of data for the all-to-all algorithm may be viewed as a distributed matrix, with the all-to-all algorithm transposing this block distribution. It is important to note that, in exemplary embodiments of the present invention, the data within each block is not rearranged in the transposition, just the order of the data blocks themselves.

FIG. 6 shows an exemplary all-to-all data source data block layout for a group of size six, showing an exemplary initial distribution for an all-to-all operation. Each column represents that data block each process has for all the other processes. Each block is labeled with a two-index label, with the first index indicating the process from which the data originates with the second index being the rank (the term "rank", being used in accordance with the MPI standard, in which each member of the communicator (the group of processes that defines the collective) is given a rank, or an ID) of that block's destination process.

After the all-to-all operation is applied to the data in the example of FIG. 6, with the data blocks transposed, the data-block layout displayed in FIG. 7 results.

With the all-to-all-v/w algorithms a similar data transposition is performed. Such transform differs as follows:
1. The data size may differ between blocks, and may even be of length zero.
2. The blocks of data both at the source and destination buffers are not necessarily arranged in an increasing order by destination (source buffer) or source (result buffer). The actual block ordering is specified as part of the all-to-all-v/w operations.

Therefore, similar communication patterns may be used to implement all-to-all and all-to-all-v/w.

The actual matrix transform is performed over sub-blocks of data. The term "the "actual matrix transform" is used herein because the blocks of data transfer defined by the operation can be viewed as a matrix transform, when each element in the matrix is a block of data. The columns of the matrix are the blocks of data owned by each process. Each process has a block of data associated with every process in the group, so the matrix can be viewed as a square matrix. For alltoall, the size of all the blocks is identical, for alltoall-v and alltoall-w, block sizes may be different. From a block-like view of the data layout (not the actual size of each block) alltoall-v and alltoall-w still are square.

For the purpose of the transform, horizontal submatrix dimension, $d_h$, and vertical submatrix dimension, $d_v$, are defined. The sub-block dimensions need not be an integer divisor of the full matrix dimension, and $d_h$ and $d_v$ need not be equal. Incomplete sub-blocks are permitted; that is, for a given group size, there are subgroups for which the ratio of the groups size to the sub-block size is not an integer. This situation gives "leftover" blocks at the edges. By way of particular non-limiting example, such "leftover" blocks would be present in a matrix of size 11, with sub-blocks of size 3. Finally, the vertical and horizontal ranges of values in the full matrix need not be contiguous, e.g., when mapped onto the full matrix, such a submatrix may be distributed into several different contiguous blocks of data over the matrix.

As an example, if we take $d_h=h_v=2$, and we use processes group {1,2}, {0,3} and {4,5} to sub-block the matrix, FIG. 8 uses coding [a] through [i] to show how the full matrix, may, in a non-limiting example, be subdivided into 2×2 sub-blocks. Note that there are three distributed sub-blocks in the example: 1) data blocks (0,0)(0,3)(3,0)(3,3), shown as [a]; 2) data blocks (0,1)(0,2)(3,1)(3,2), shown as [c]; and 3) (1,0)(2,0)(1,3)(2,3), shown as [b].

The full end-to-end all-to-all is orchestrated, in exemplary embodiments of the present invention, using a reduction tree. As processes make a call to the collective operation, the reduction tree is used by each process to register with the collective operation. When all members of a sub-group have registered with the operation, the sub-group is marked as active. When both source and destination subgroup are active, that subgroup may be transposed.

In certain exemplary embodiments of the present invention, the collective operation is executed in the following manner:
1. Each process in the group registers itself with the control tree, by passing up an arrival notification to the controller.
2. Once all members of a subgroup arrive, this subgroup is marked as ready for operation.
3. As source and destination groups are ready, these are paired and assigned to a data repacking unit.
4. Data is transferred from the source processes to the data repacking unit. This unit repacks the data and sends it to the appropriate destinations.
5. Each source process is notified of completion, as it each destination process.
6. The operation completes locally at each process, once all expected data has been received, and transferring all source data is complete.

Figure 9:
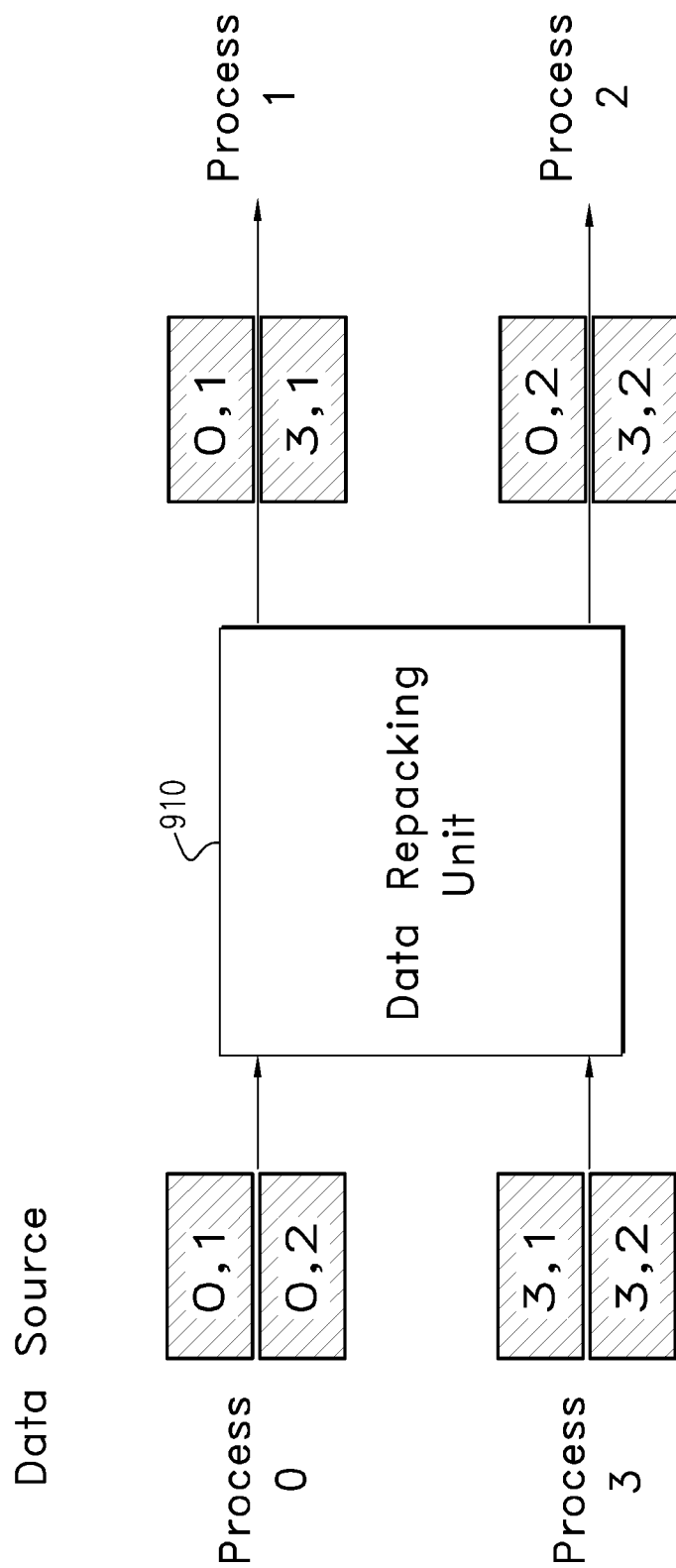
FIG. 9 is a simplified pictorial illustration depicting transposition of a sub-block, in accordance with exemplary embodiments of the present invention.

FIG. 9 shows how one of the data-repacking units 910 in the system is used, in a non-limiting exemplary embodiment, to transpose the submatrix defined by the horizontal subgroup {0,3} and vertical subgroup {1,2}. Processes 0 and 3 each sends its portion of the submatrix to the data-repacking unit, which rearranges the data, sending to processes 1 and 2. In the specific non-limiting example shown in FIG. 9, process 0 has the data elements (0,1) and (0,2), process 3 has the data elements (3,1) and (3,2). This data is sent to the controller which sends (0,1) and (3,1) to process 1 and (0,2) and (3,2) to process 2. Final data-placement in the result buffer is handled by the end-point. In general, in exemplary embodiments the repacking unit 910 treats all data processed thereby as a contiguous "blob" of data—the repacking unit 910 does not recognize any structure in the data. The final data distribution at the end-points within each block may be contiguous, in which case the repacking unit and the destination process will have the same view of the data. However, the final data layout at the destination process may be non-contiguous, in which case it is the end-point that distributes the data appropriately at the destination. It is appreciated that the end-point or any other appropriate system component may distribute the data appropriately.

REFERENCES

Ana Gainaru, R. L. Graham, Artem Polyakov, Gilad Shainer (2016). *Using InfiniBand Hardware Gather-Scatter Capabilities to Optimize MPI All-to-All* (Vol. Proceedings of the 23rd European MPI Users' Group Meeting). Edinburgh, United Kingdom: ACM.

MPI Forum, (2015). *Message Passing Interface*. Knoxville: University of Tennessee.

J. Bruck, Ching-Tien Ho, Shlomo Kipnis, Derrick Weathersby (1997). *Efficient algorithms for all-to-all communications in multi port message passing systems*. In IEEE Transactions on Parallel and Distributed Systems, pages 298-309.

Jelena Pjevsivac-Grbovic, Thara Angskun, Geroge Bosilca, Graham Fagg, Edgar Gabriel, Jack Dongarra, (2007). *Performance analysis of MPI collective operations*. Cluster Computing.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
providing a plurality of processes interconnected by a network, each of the plurality of processes being configured to hold a block of data destined for others of the plurality of processes;
receiving from one or more of the processes a set of data for all-to-all data exchange, the set of data being configured as a plurality of blocks of data in a matrix as matrix data, the matrix being distributed among the plurality of processes;
transposing the matrix data by changing the position of selected blocks of data of the plurality of blocks of data relative to the other blocks of data of the plurality of the blocks of data, without changing the structure of each of the blocks of data;
sending the transposed matrix data over the network; and
receiving and repacking the transposed matrix data from the network, and conveying the repacked matrix data to destination processes.

2. The method according to claim 1, and also comprising providing a control tree configured to control the plurality of processes and repacking the transposed matrix data.

3. The method according to claim 2, and wherein the control tree is further configured to:
receive registration messages from each of the plurality of processes;
mark a given subgroup of the plurality of processes as ready for operation when registration messages have been received from all members of said given subgroup;
when a given subgroup which is a source subgroup and a corresponding subgroup which is a destination subgroup are ready for operation, pair the given source subgroup and the given destination subgroup; and
notify each said source subgroup and each said destination subgroup when operations relating to each said source subgroup and each said destination subgroup have completed.

4. The method according to claim 3, and wherein the control tree is configured, in addition to pairing the given source subgroup and the given destination subgroup, to assign the given source subgroup and the given destination subgroup to an instance of data repacking circuitry.

5. The method according to claim 2 and wherein the control tree comprises a reduction tree.

6. The method according to claim 2, and also comprising providing assigning circuitry other than the control tree, the assigning circuitry being configured to assign a given source subgroup and a given destination subgroup to an instance of data repacking circuitry.

7. A computer software product for use in conjunction with a plurality of processes interconnected by a network, each of the plurality of processes being configured to hold a block of data destined for others of the plurality of processes, the product comprising a non-transitory computer-readable medium in which program instructions are stored, which instructions, when read by one or more processors, cause the one or more processors:
to receive from one or more of the processes a set of data for all-to-all data exchange, the set of data being configured as a plurality of blocks of data in a matrix as matrix data, the matrix being distributed among the plurality of processes;
to transpose the matrix data by changing the position of selected blocks of data of the plurality of blocks of data relative to the other blocks of data of the plurality of the blocks of data, without changing the structure of each of the blocks of data;
to send the transposed matrix data over the network; and
to receive and repack the transposed matrix data from the network, and to convey the repacked matrix data to destination processes.

8. The product according to claim 7, wherein the instructions cause the one or more processors to provide a control tree configured to control the plurality of processes and repacking the transposed matrix data.

9. The product according to claim 8, and wherein the control tree is further configured to:
receive registration messages from each of the plurality of processes;
mark a given subgroup of the plurality of processes as ready for operation when registration messages have been received from all members of said given subgroup;
when a given subgroup which is a source subgroup and a corresponding subgroup which is a destination subgroup are ready for operation, pair the given source subgroup and the given destination subgroup; and
notify each said source subgroup and each said destination subgroup when operations relating to each said source subgroup and each said destination subgroup have completed.

10. The product according to claim 9, and wherein the control tree is configured, in addition to pairing the given source subgroup and the given destination subgroup, to assign the given source subgroup and the given destination subgroup to an instance of data repacking circuitry.

11. The product according to claim 8, and wherein the control tree comprises a reduction tree.

12. The product according to claim 8, wherein the instructions cause the one or more processes to assign a given source subgroup and a given destination subgroup to an instance of data repacking circuitry.

* * * * *